(No Model.)
A. WEBER.
ANGLE ATTACHMENT FOR DENTAL ENGINES.
No. 299,040. Patented May 20, 1884.
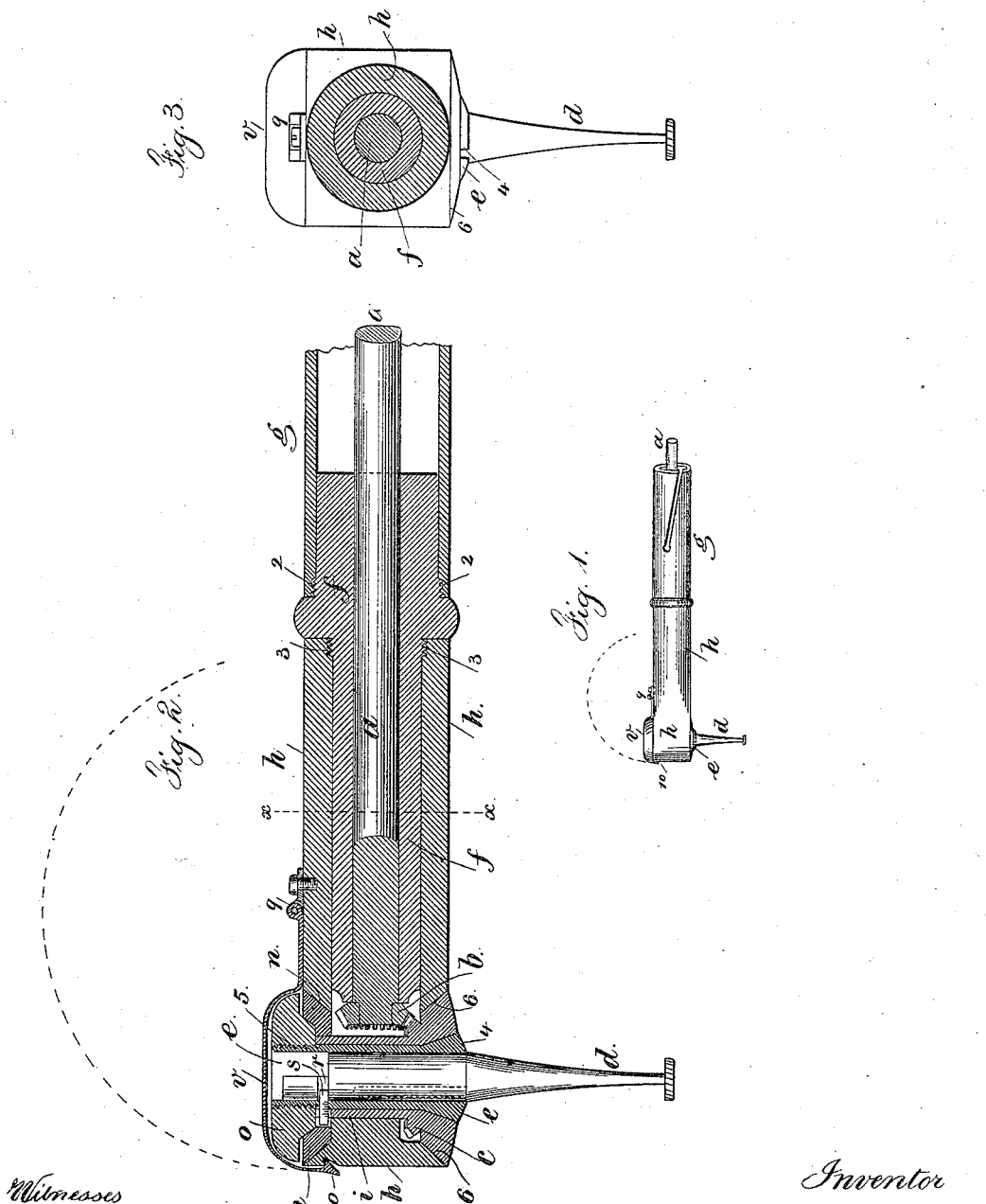
Witnesses
Chas H Smith
J Stail
Inventor
August Weber
per Lemuel W. Serrell
atty.

UNITED STATES PATENT OFFICE.

AUGUST WEBER, OF NEW YORK, N. Y., ASSIGNOR OF ONE-HALF TO GEORGE E. HODGE, OF SAME PLACE.

ANGLE ATTACHMENT FOR DENTAL ENGINES.

SPECIFICATION forming part of Letters Patent No. 299,040, dated May 20, 1884.

Application filed January 28, 1884. (No model.)

*To all whom it may concern:*

Be it known that I, AUGUST WEBER, of the city and State of New York, have invented an Improvement in Angle Attachments for Dental Engines, of which the following is a specification.

Angle attachments have heretofore been made for dental engines in which the tool is held in a revolving stock; but in consequence of the small space in the mouth where such angle attachment usually is employed it is difficult to make the parts sufficiently small. Besides this, if there is any looseness of the drill or tool in the stock, the tool does not work accurately, and is liable to be broken or to come out of the stock.

My invention is for securing the tool into the stock in a very firm manner, so that it cannot become loose in use, and there is no risk of the tool coming out of the chuck, nor of the stock binding or becoming too loose in the holder, and the parts are very compact and strong and occupy but little space.

In the drawings, Figure 1 is a side view of the attachment in about the ordinary size. Fig. 2 is a longitudinal and Fig. 3 a cross section at the line $x\, x$ in larger size of said attachment.

I make use of a holder in which is a rotary shaft, $a$, with a bevel-gear wheel, $b$, at the end, which meshes into the gear-wheel $c$; and $d$ is the drill or tooth, which is revolved for drilling or excavating dental cavities. These parts are of a character corresponding generally to the devices shown in English Patent No. 1,017 of 1864. The shaft $a$ passes through the tubular bearing $f$, and at $g$ is a sleeve, screwed at 2 to the bearing $f$. This sleeve $g$ is split so as to be elastic, and it is slipped over the end of the ordinary dental hand-piece, and the shaft $a$ is grasped by the chuck or tool-holder of the hand-piece, so as to be revolved thereby. The stock $h$ is tubular, and passes over the bearing $f$, and is secured by the screw at 3, and in this stock $h$ there is a cross hole or opening, either at right angles or at an inclination to the shaft $a$. The drill or tool $d$ is received within the chuck $e$, the end portion 4 of which is split longitudinally at two or more places, and it is conical and provided with a screw-thread, 5, at its upper end. There is a tubular shaft, $i$, formed with or attached to the bevel-gear $c$, and this shaft is made with a conical end, 6, setting into the side of the stock $h$, which is recessed for its reception, so that this conical portion 6 forms a bearing that receives the pressure when the drill or tool is pressed to its work, In order to hold this tubular shaft in place, I introduce at the other end the conical collar $n$, forming a bearing against the stock $h$, and the nut $o$, screwed upon the tubular chuck $e$, holds the parts in place, and also causes the chuck to grasp and hold the tool. The tubular shaft $i$, the chuck $e$, and the collar $n$ must all turn together, and the rotation must not tend to loosen the nut $o$. To effect these objects I introduce a pin, $s$, in the tube of the chuck, the outer end of which passes into a notch at the upper end of the tubular shaft $i$ and into a notch in the eye of the washer or bearing $n$, and the inner end of this pin $s$ projects within the tubular chuck $e$, and the inner end of the tool $d$ is removed at one side to pass by the pin, and formed with a notch at $r$, so that after the tool has been inserted into the chuck it is partially rotated to bring the notch $r$ to the pin $s$, and then the nut $o$ is screwed up to tighten the chuck. The chuck centers and holds the tool tightly, and the pin $s$ and notch $r$ prevent the tool being drawn out if the chuck should become loose, and the pin insures the rotation of the tool by the revolution of the gear $c$ and tubular shaft $i$.

It will be apparent that this improved angle attachment is adapted to dental drills and tools of any description, and that the parts are very compact and reliable.

It is usually preferable to employ the cap $v$, hinged at 9 to the stock $h$, and kept down by a spring-catch at 10, so as to prevent the rotating nut $o$ coming into contact with the mouth or any part of the person.

It will be apparent that in cases where it is not desired to clamp the tool the tube that receives the tool may be whole, instead of being split at one end, and in cases where the inner end of the nut is of the same shape as the conical washer such washer may be dispensed with or formed as one with the nut, the other parts remaining the same.

I claim as my invention—

1. The combination, with the shaft $a$, the bevel-gears, and tool, of the tubular bearing $f$ for the shaft $a$, the screw 3, and the stock $h$, screwed upon the tubular bearing, substantially as set forth.

2. The combination, with the tubular shaft $i$, the bevel-gears, and the tool, of a tubular split chuck within the shaft adapted to receive, clamp, and hold the tool, substantially as set forth.

3. The combination, with the shaft $a$, the bevel-gears, and the stock $h$, of a tubular shaft having a conical bearing at one end, a conical washer surrounding the other end, and a nut to secure the parts in place, substantially as set forth.

4. The combination, with the stock, shaft, and bevel-gears, of a tubular shaft having a conical end bearing, a chuck within such shaft for holding the tool, and a nut for closing the chuck and clamping the tool, substantially as set forth.

5. The combination, with the stock, shaft, and bevel-gears, of a tubular shaft having an end bearing, a chuck within such shaft, a washer forming a bearing against the stock, and a nut to act upon the chuck and hold the tool, substantially as specified.

6. The tubular shaft having an end bearing, in combination with the bevel-gearing, the washer, the nut, and a pin acting to insure the rotation together of the chuck, the tubular shaft, the washer, and the tool, substantially as set forth.

7. The combination, with the angle attachment for dental engines, containing a clamping chuck and nut, of a movable cap covering the nut, substantially as set forth.

Signed by me this 22d day of January, A.D. 1884.

A. WEBER.

Witnesses:
 GEO. T. PINCKNEY,
 WILLIAM G. MOTT.